US012811641B2

(12) United States Patent
An

(10) Patent No.: US 12,811,641 B2
(45) Date of Patent: Nov. 24, 2026

(54) ELECTRONIC DEVICE FOR TRANSMITTING SRS AND AN OPERATION METHOD THEREOF

(71) Applicant: SAMSUNG ELECTRONICS CO., LTD., Suwon-si (KR)

(72) Inventor: Yongjun An, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 358 days.

(21) Appl. No.: 18/384,657

(22) Filed: Oct. 27, 2023

(65) Prior Publication Data

US 2024/0056146 A1 Feb. 15, 2024

Related U.S. Application Data

(63) Continuation of application No. PCT/KR2022/006074, filed on Apr. 28, 2022.

(30) Foreign Application Priority Data

Apr. 29, 2021 (KR) ........................ 10-2021-0055936

(51) Int. Cl.
*H04B 7/06* (2006.01)
*H04L 5/14* (2006.01)

(52) U.S. Cl.
CPC ......... *H04B 7/0617* (2013.01); *H04L 5/1469* (2013.01)

(58) Field of Classification Search
CPC ....... H04L 5/1469; H04L 5/14; H04B 7/0404; H04B 1/44
See application file for complete search history.

(56) References Cited

U.S. PATENT DOCUMENTS 10,419,040 B1 9/2019 Bai
10,454,550 B2 10/2019 Bai
(Continued)

FOREIGN PATENT DOCUMENTS

CN 210578543 U 5/2020
CN 111628801 A 9/2020
(Continued)

OTHER PUBLICATIONS

Communication dated Aug. 10, 2022, issued by the International Searching Authority in counterpart International Application No. PCT/KR2022/006074 (PCT/ISA/210).
(Continued)

*Primary Examiner* — Kevin M Cunningham
(74) *Attorney, Agent, or Firm* — Sughrue Mion, PLLC

(57) ABSTRACT

An electronic device includes: a plurality of antennas; a first radio-frequency front-end (RFFE) including a third switch and multiple switches (a first switch and a second switch); a second RFFE; a radio-frequency integrated circuit (RFIC) connected to the first RFFE and the second RFFE; and a processor. The first RFFE receives a sounding reference signal (SRS) from the second RFFE. The processor is configured to: determine whether to transmit the SRS simultaneously with a signal generated in the first RFFE by using one antenna; and based on a determination to simultaneously transmit the SRS and the signal, adjust the third switch and the multiple switches to simultaneously transmit the SRS and the signal by using the one antenna.

14 Claims, 7 Drawing Sheets

(56) References Cited

U.S. PATENT DOCUMENTS

| | | | | |
|---|---|---|---|---|
| 10,735,156 | B2 | 8/2020 | Chen et al. | |
| 11,223,375 | B2 | 1/2022 | Kim et al. | |
| 11,405,069 | B2 | 8/2022 | Cho et al. | |
| 11,558,161 | B2 | 1/2023 | Choi et al. | |
| 2011/0096815 | A1* | 4/2011 | Shin | H04W 52/42<br>375/219 |
| 2018/0316321 | A1 | 11/2018 | Maxim et al. | |
| 2019/0097715 | A1 | 3/2019 | Maldonado et al. | |
| 2019/0288716 | A1 | 9/2019 | Bai | |
| 2019/0288732 | A1 | 9/2019 | Bai | |
| 2020/0304265 | A1 | 9/2020 | Kim et al. | |
| 2021/0112399 | A1 | 4/2021 | Gopal et al. | |
| 2021/0159926 | A1* | 5/2021 | Kim | H04B 1/401 |
| 2023/0079798 | A1 | 3/2023 | Yi | |

FOREIGN PATENT DOCUMENTS

| | | | |
|---|---|---|---|
| EP | 3 057 245 | A1 | 8/2016 |
| EP | 3 696 984 | A1 | 8/2020 |
| JP | 2019-510420 | A | 4/2019 |
| KR | 10-2015-0042682 | A | 4/2015 |
| KR | 10-2019-0060520 | A | 6/2019 |
| KR | 10-2020-0008599 | A | 1/2020 |
| KR | 10-2020-0043735 | A | 4/2020 |
| KR | 10-2020-0096821 | A | 8/2020 |
| KR | 10-2020-0111749 | A | 9/2020 |
| WO | 2019/174281 | A1 | 9/2019 |

OTHER PUBLICATIONS

Communication dated Aug. 10, 2022, issued by the International Searching Authority in counterpart International Application No. PCT/KR2022/006074 (PCT/ISA/237).

Extended European Search Report dated Aug. 19, 2024, issued byt the European Patent Organization in European Application No. 22796167.9.

Communication issued Jul. 3, 2025 by the Korean Intellectual Property Office in Korean Patent Application No. 10-2021-0055936.

* cited by examiner

ELECTRONIC DEVICE FOR TRANSMITTING SRS AND AN OPERATION METHOD THEREOF

CROSS-REFERENCE TO RELATED APPLICATIONS

This application is a by-pass continuation application of International Application No. PCT/KR2022/006074, filed on Apr. 28, 2022, which is based on and claims priority to Korean Patent Application No. 10-2021-0055936, filed on Apr. 29, 2021, in the Korean Intellectual Property Office, the disclosures of which are incorporated by reference herein their entireties.

BACKGROUND

1. Field

The disclosure relates to an electronic device for transmitting a sounding reference signal (SRS) and, more particularly, to an electronic device for transmitting an SRS along with a different signal and an operating method thereof.

2. Description of Related Art

A base station may use an SRS (transmitted by an electronic device, e.g., a mobile terminal) and estimate the state of a channel with an antenna included in the electronic device. A technology, so-called 'SRS switching' enables an SRS to be transmitted to a base station through a plurality of antennas included in an electronic device. Based on SRS switching, the base station may perform beamforming by predicting a wireless environment between the base station and the electronic device. When SRS switching is applied to the electronic device, the base station may increase total throughput within a cell without investing more resources, thereby establishing an efficient communication environment.

An electronic device may transmit an SRS to connect to a plurality of wireless networks at the same time or connect to an wireless network in order to use a plurality of frequency bands supported by the wireless network.

When the electronic device uses a plurality of frequency bands simultaneously, a time division duplexing (TDD) mode and a frequency division duplexing (FDD) mode may be used simultaneously. A frequency band of the TDD mode may be a frequency band in which the electronic device receives data (or a signal) by using a plurality of antennas (e.g., four antennas) and a frequency band in which the electronic device may transmit data by using one antenna among the plurality of antennas. The electronic device may use a plurality of antennas to transmit an SRS by using the frequency band of the TDD mode, and the plurality of antennas may be the same as those for transmitting data in the FDD mode that is used simultaneously with the TDD mode. The electronic device may include an external frequency branch circuit to independently and simultaneously transmit an SRS and data. The frequency branch circuit may cause insertion loss and does not properly pass a signal in a specific band, and thus, a switch circuit for bypass may be additionally included in the electronic device. A communication circuit of the electronic device may need to include the frequency branch circuit and the switch circuit, thus the communication circuit would have a complex structure.

SUMMARY

According to an aspect of the disclosure, an electronic device includes: a plurality of antennas; a first radio-frequency (RF) front-end module comprising a third switch configured to select one or more signals to be transmitted to or to be received from the plurality of antennas and a plurality of switches configured to select one or more transmission paths and one or more reception paths established with the plurality of antennas, wherein the plurality of switches include a first switch and a second switch; a second RF front-end module; a radio-frequency integrated circuit (RFIC) connected to the first RF front-end module and the second RF front-end module; and a processor, wherein the first RF front-end module is configured to receive a sounding reference signal (SRS) from the second RF front-end module, and wherein the processor is configured to: determine whether to transmit the SRS simultaneously with a signal generated in the first RF front-end module by using one antenna among the plurality of antennas; and based on a determination to simultaneously transmit the SRS and the signal by using the one antenna, adjust the third switch and the plurality of switches to simultaneously transmit the SRS and the signal generated by the first RF front-end module by using the one antenna.

In an embodiment, the third switch is connected to a port configured to receive the SRS from the second RF front-end module, and wherein, based on a determination to transmit the SRS, the processor is configured to adjust the third switch to select the SRS received from the second RF front-end module.

In an embodiment, the SRS is used for a frequency band in which time division duplexing (TDD) is supported.

In an embodiment, the signal generated by the first RF front-end module is transmitted in a frequency band in which frequency division duplexing (FDD) is supported.

In an embodiment, the third switch is a multi-on switch.

In an embodiment, a port configured to receive the SRS from the second RF front-end module is connected to the second switch, and wherein, based on a determination to transmit the SRS, the processor is further configured to adjust the plurality of switches and the third switch to select the SRS received from the second RF front-end module.

In an embodiment, the third switch is connected to another antenna among the plurality of antennas, and wherein, based on a determination to transmit the SRS simultaneously with the signal by not using the one antenna, the processor is further configured to adjust the third switch to transmit the SRS by using the one antenna and transmit the signal generated by the first RF front-end module by using the another antenna.

In an embodiment, the electronic device is configured to support an E-UTRA NR dual connectivity (ENDC) network in which both a long-term evolution (LTE) network and a fifth-generation (5G) network are accessible.

In an embodiment, the electronic device is configured to support carrier aggregation in a fifth-generation (5G) network.

In an embodiment, the electronic device is configured to support beamforming by using the plurality of antennas.

According to an aspect of the disclosure, a communication circuit includes: a first radio-frequency (RF) front-end module comprising: a third switch configured to select one or more signals to be transmitted to or to be received from a plurality of antennas, and a plurality of switches configured to establish one or more transmission paths and one or more reception paths with the plurality of antennas, wherein the plurality of switches comprise a first switch and a second switch; a second RF front-end module; and a radio-frequency integrated circuit (RFIC) connected to the first RF front-end module and the second RF front-end module, wherein the first RF front-end module is configured to receive a sounding reference signal (SRS) from the second RF front-end module, and wherein the third switch and the plurality of switches included in the first RF front-end module are adjusted to simultaneously transmit the SRS and a signal generated by the first RF front-end module by using one antenna among the plurality of antennas.

In an embodiment, the third switch is connected to a port configured to receive the SRS from the second RF front-end module, and wherein the third switch is adjusted to select the SRS received from the second RF front-end module.

In an embodiment, the SRS is used for a frequency band in which time division duplexing (TDD) is supported.

In an embodiment, the signal generated by the first RF front-end module is transmitted in a frequency band in which frequency division duplexing (FDD) is supported.

In an embodiment, the third switch is a multi-on switch.

According to an aspect of the disclosure, a communication circuit includes: a first radio-frequency (RF) front-end module comprising: a first switch configured to select a first element to establish a first transmission path with a plurality of antennas or a second element to establish a first reception path with the plurality of antennas, and a second switch configured to select a third element to establish a second transmission path with the plurality of antennas or a fourth element to establish a second reception path with the plurality of antennas; a second RF front-end module; and a radio-frequency integrated circuit (RFIC) connected to the first RF front-end module and the second RF front-end module, wherein the first RF front-end module is configured to receive a sounding reference signal (SRS) from the second RF front-end module, and wherein the first switch and the second switch included in the first RF front-end module are adjusted to simultaneously transmit the SRS and a signal generated by the first RF front-end module by using one antenna among the plurality of antennas.

In an embodiment, the first element or the third element is a power amplifier.

In an embodiment, the second element or the fourth element is a low-noise amplifier.

In an embodiment, the communication circuit further comprises a third switch configured to select a set of signals to be transmitted to or to be received from the plurality of antennas.

In an embodiment, the third switch is connected to a port configured to receive the SRS from the second RF front-end module, and wherein the third switch is adjusted to select the SRS received from the second RF front-end module.

According to one or more embodiments of the disclosure, an electronic device may support SRS switching even in a situation where the electronic device is connected to an Evolved Universal Terrestrial Radio Access (E-UTRA) New Radio (NR) dual connectivity (ENDC) network or needs to perform carrier aggregation.

According to one or more embodiments of the disclosure, when an electronic device supports SRS switching, a base station may perform beamforming, thereby increasing total throughput without investing resources.

According to one or more embodiments of the disclosure, performance of Multi-Input Multi-Output (MIMO) may be improved by using an SRS.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
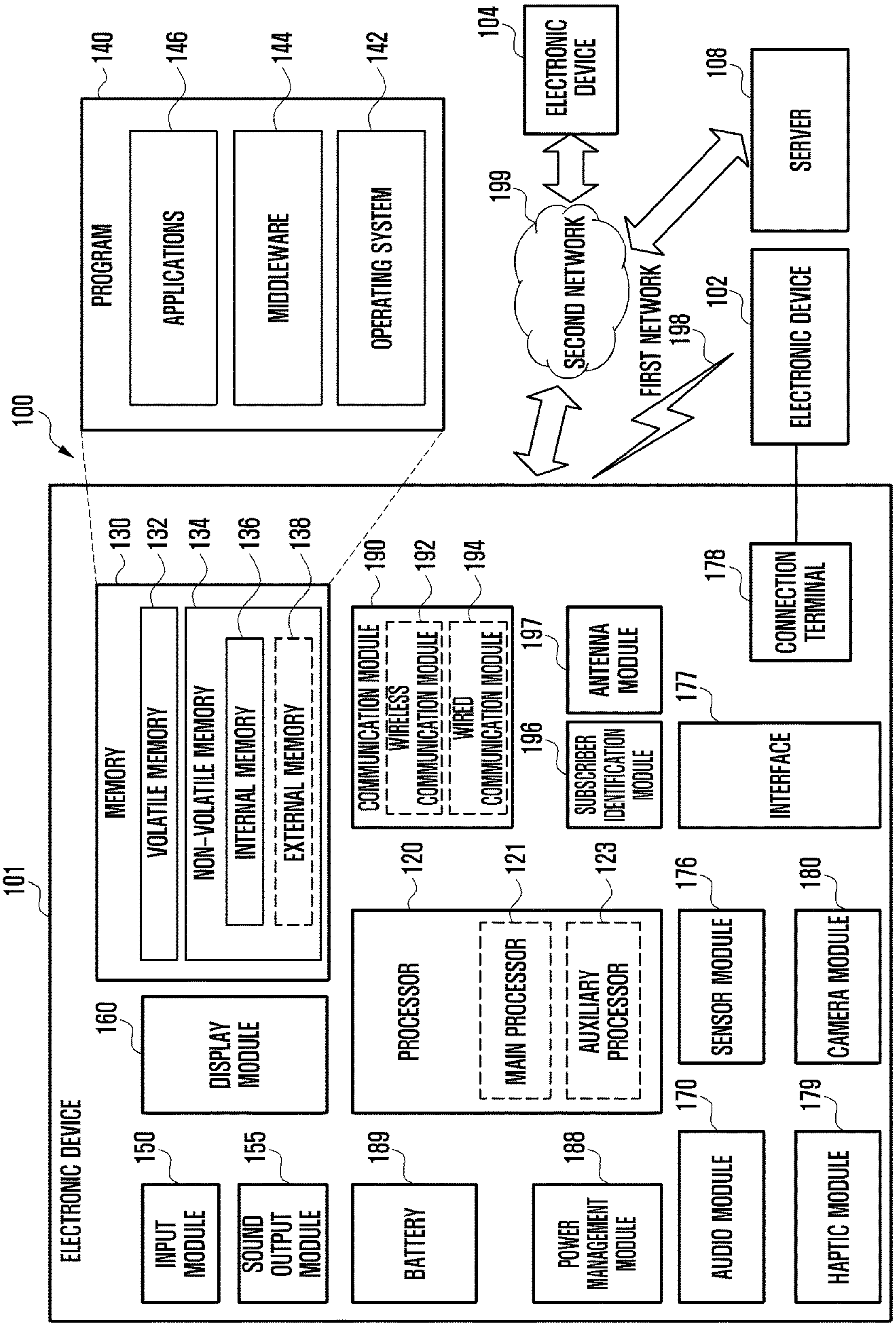
FIG. 1 is a block diagram of an electronic device in a network environment according to one or more embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197. According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
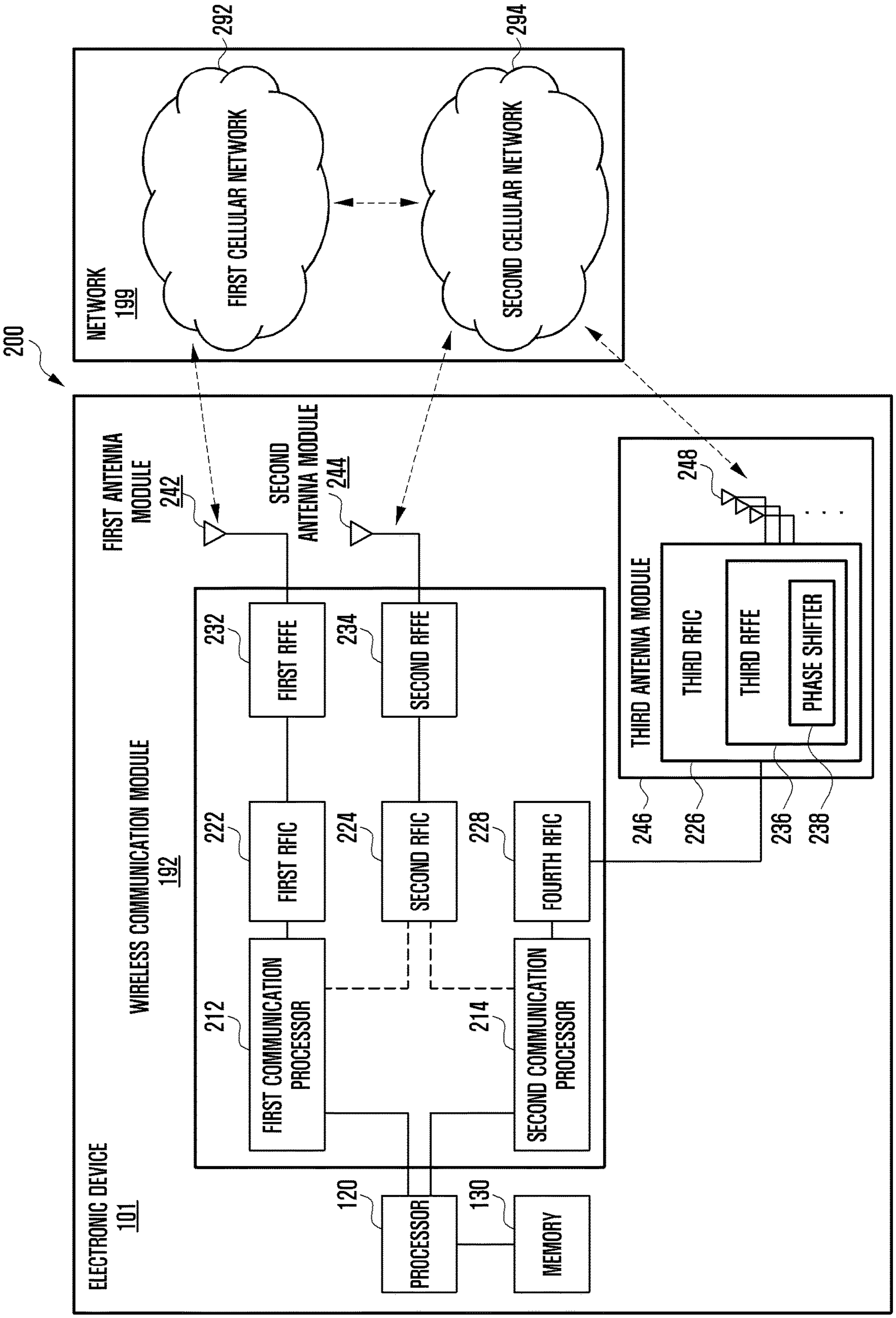
FIG. 2 is a block diagram of an electronic device for supporting communication via a legacy network and communication via a fifth generation (5G) network according to one or more embodiments.

FIG. 2 is a block diagram 200 illustrating an electronic device 101 for supporting communication via a legacy network and communication via a 5G network according to one or more embodiments. Referring to FIG. 2, the electronic device 101 may include a first communication processor 212, a second communication processor 214, a first radio-frequency integrated circuit (RFIC) 222, a second RFIC 224, a third RFIC 226, a fourth RFIC 228, a first radio-frequency front-end (RFFE) 232, a second RFFE 234, a first antenna module 242, a second antenna module 244, and an antenna 248. The electronic device 101 may further include a processor 120 and a memory 130. A network 199 may include a first network 292 and a second network 294. According to another embodiment, the electronic device 101 may further include at least one of the components illustrated in FIG. 1, and the network 199 may further include at least one different network. According to an embodiment, the first communication processor 212, the second communication processor 214, the first RFIC 222, the second RFIC 224, the fourth RFIC 228, the first RFFE 232, and the second RFFE 234 may form at least part of a wireless communication module 192. According to another embodiment, the fourth RFIC 228 may be omitted or may be included as part of the third RFIC 226.

The first communication processor 212 may establish a communication channel in a band to be used for wireless communication with the first network 292, and may support communication via a legacy network through the established communication channel. According to one or more embodiments, the first network 292 may be a legacy network including a second-generation (2G), 3G, 4G, or long-term evolution (LTE) network. The second communication processor 214 may establish a communication channel corresponding to a specified band (e.g., about 6 GHz to about 60 GHz) in a band to be used for wireless communication with the second network 294, and may support communication via a 5G network through the established communication channel. According to one or more embodiments, the second network 294 may be a 5G network defined by the 3GPP. In addition, according to an embodiment, the first communication processor 212 or the second communication processor 214 may establish a communication channel corresponding to a different specified band (e.g., about 6 GHz or lower) in the band to be used for wireless communication with the second network 294, and may support communication via a 5G network through the established communication channel. According to an embodiment, the first communication processor 212 and the second communication processor 214 may be configured in a single chip or a single package. According to one or more embodiments, the first communication processor 212 or the second communication processor 214 may be configured along with the processor 120, an auxiliary processor 123, or a communication module 190 in a single chip or a single package.

In transmission, the first RFIC 222 may convert a baseband signal generated by the first communication processor 212 into a radio-frequency (RF) signal of about 700 MHz to about 3 GHz used for the first network 292 (e.g., a legacy network). In reception, an RF signal may be obtained from the first network 292 (e.g., the legacy network) through an antenna (e.g., the first antenna module 242), and may be preprocessed by an RFFE (e.g., the first RFFE 232). The first RFIC 222 may convert the preprocessed RF signal into a baseband signal to be processed by the first communication processor 212.

In transmission, the second RFIC 224 may convert a baseband signal generated by the first communication processor 212 or the second communication processor 214 into an RF signal (hereinafter, "5G sub-6 RF signal") in a sub-6 band (e.g., about 6 GHz or lower) used for the second network 294 (e.g., a 5G network). In reception, a 5G sub-6 RF signal may be obtained from the second network 294 (e.g., the 5G network) through an antenna (e.g., the second antenna module 244), and may be preprocessed by an RFFE (e.g., the second RFFE 234). The second RFIC 224 may convert the preprocessed 5G sub-6 RF signal into a baseband signal to be processed by a corresponding communication processor of the first communication processor 212 or the second communication processor 214.

The third RFIC 226 may convert a baseband signal generated by the second communication processor 214 into an RF signal (hereinafter, "5G above-6 RF signal") in a 5G above-6 band (e.g., about 6 GHz to about 60 GHz) used for the second network 294 (e.g., the 5G network). In reception, a 5G above-6 RF signal may be obtained from the second network 294 (e.g., the 5G network) through an antenna (e.g., an antenna 248) and may be preprocessed by the third RFFE 236. The third RFIC 226 may convert the preprocessed 5G above-6 RF signal into a baseband signal to be processed by the second communication processor 214. According to an embodiment, the third RFFE 236 may be configured as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 into an RF signal (hereinafter, "IF signal") in an intermediate frequency band (e.g., about 9 GHz to about 11 GHz), and may transmit the IF signal to the third RFIC 226. The third RFIC 226 may convert the IF signal into a 5G above-6 RF signal. In reception, a 5G above-6 RF signal may be received from the second network 294 (e.g., the 5G network) through an antenna (e.g., the antenna 248), and may be converted into an IF signal by the third RFIC 226. The fourth RFIC 228 may convert the IF signal into a baseband signal to be processed by the second communication processor 214.

According to an embodiment, the first RFIC 222 and the second RFIC 224 may be configured as at least part of a single chip or a single package. According to an embodiment, the first RFFE 232 and the second RFFE 234 may be configured as at least part of a single chip or a single package. According to an embodiment, at least one of the first antenna module 242 or the second antenna module 244 may be omitted, or may be combined with a different antenna module to process corresponding RF signals in a plurality of bands.

According to an embodiment, the third RFIC 226 and the antenna 248 may be disposed on the same substrate to form a third antenna module 246. For example, the wireless communication module 192 or the processor 120 may be disposed on a first substrate (e.g., a main PCB). In this case, the third RFIC 226 may be disposed in a portion (e.g., a lower surface) of a second substrate (e.g., a sub-PCB) separate from the first substrate, and the antenna 248 may be disposed in another portion (e.g., an upper surface), thereby forming the third antenna module 246. The third RFIC 226 and the antenna 248 may be disposed on the same substrate, thereby reducing the length of a transmission line therebetween, which may reduce loss (e.g., attenuation) of, for example, a signal in a high-frequency band (e.g., about 6 GHz to about 60 GHz) used for communication via a 5G network due to the transmission line. Accordingly, the electronic device 101 may improve the quality or speed of communication with the second network 294 (e.g., the 5G network).

According to an embodiment, the antenna 248 may be configured as an antenna array including a plurality of antenna elements which may be used for beamforming. In this case, the third RFIC 226 may include, for example, a plurality of phase shifters 238 corresponding to the plurality of antenna elements as part of the third RFFE 236. In transmission, each of the plurality of phase shifters 238 may convert the phase of a 5G above-6 RF signal to be transmitted to an external device (e.g., a base station of the 5G network) of the electronic device 101 through a corresponding antenna element. In reception, each of the plurality of phase shifters 238 may convert the phase of a 5G above-6 RF signal received from the outside through a corresponding antenna element into the same phase or substantially the same phase. This enables transmission or reception through beamforming between the electronic device 101 and the outside.

The second network 294 (e.g., the 5G network) may operate independently of the first network 292 (e.g., the legacy network) (e.g., stand-alone (SA) mode), or may be connected to operate (e.g., non-stand-alone (NSA) mode). For example, the 5G network may have only an access network (e.g., a 5G radio access network (RAN) or a next-generation RAN (NG RAN)), and may not have a core network (e.g., a next-generation core (NGC)). In this case, after accessing the access network of the 5G network, the electronic device 101 may access an external network (e.g., the Internet) under control of a core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in a memory 230, and may be accessed by a different component (e.g., the processor 120, the first communication processor 212, or the second communication processor 214).

An electronic device including an RF front-end module described below may be a device connected to an ENDC network that simultaneously supports long-term evolution (LTE) and 5G networks, or a device that supports carrier aggregation (CA). The RF front-end module is capable of supporting sounding reference signal (SRS) switching technology, thus performing beamforming. According to an embodiment, when the electronic device is connected to the ENDC network or supports CA, the RF front-end module may simultaneously transmit an SRS and data.

Figure 3:
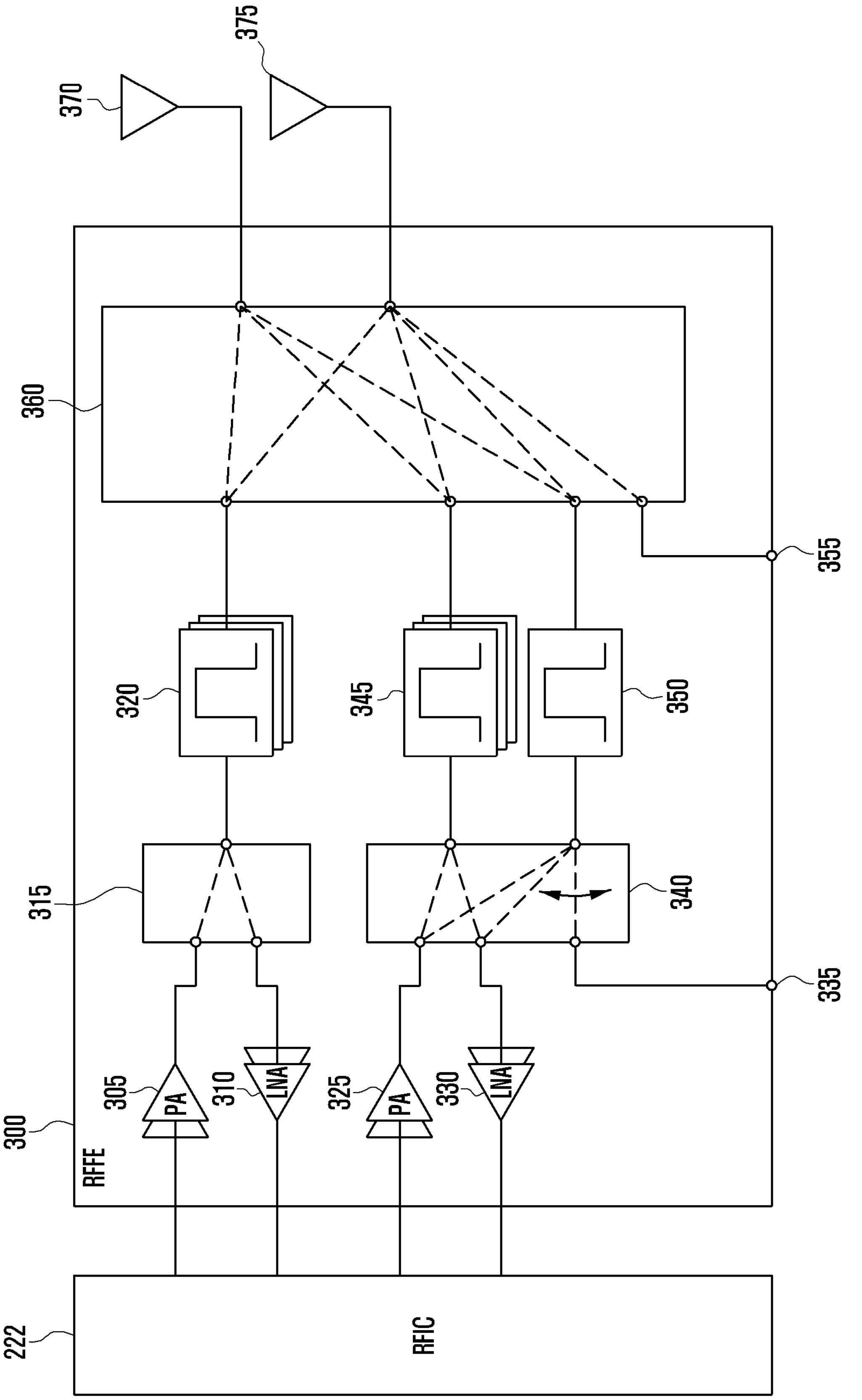
FIG. 3 is a block diagram of an radio frequency (RF) front-end module according to an embodiment.

FIG. 3 is a block diagram of an RF front-end module according to an embodiment.

Referring to FIG. 3, the RF front-end module 300 (e.g., the first RFFE 232 in FIG. 2) may include a first power amplifier (PA) 305, a second PA 325, a first low-noise amplifier (LNA) 310, a second LNA 330, a first switch (or first transmission/reception switch) 315, a second switch (or second transmission/reception switch) 340, a first filter 320, a second filter 345, a third filter 350, a third switch (or antenna switch) 360, a first port 335, and a second port 355.

According to an embodiment, the RF front-end module 300 may be configured to support both a TDD frequency band and an FDD frequency band. When an electronic device including the RF front-end module 300 operates in a TDD mode, a component that processes a signal in the TDD frequency band among components included in the RF front-end module 300 may be selected and/or operate to process the signal in the TDD frequency band. When the electronic device including the RF front-end module 300 connects to an ENDC network and uses both the TDD mode and the FDD mode, a signal processed by each component included in the RF front-end module 300 may be a signal in the TDD frequency band and/or a signal in the FDD frequency band.

According to an embodiment, at least some of the components included in the RF front-end module 300 may be configured as a plurality of components, and thus, the RF front-end module 300 may support both the TDD mode and the FDD mode separately or simultaneously. For example, the first filter 320 may be configured as a plurality of filters to respectively filter signals in a portion of the TDD frequency band and/or signals in a portion of the FDD frequency band. A signal received through the third switch 360 may be filtered through the first filter 320 into a signal in the FDD frequency band and/or a signal in the TDD frequency band.

Hereinafter, it may not be explicitly indicated whether a signal processed by a component included in the RF front-end module 300 is a signal in the FDD frequency band or a signal in the TDD frequency band. Since the signal in the FDD frequency band and the signal in the TDD frequency band may be signals that differ only in frequency band, the signal selected or processed by the component included in the RF front-end module 300 may change depending on a mode in which the RF front-end module 300 operates (e.g., TDD/FDD).

According to an embodiment, the RF front-end module 300 may be connected to an RFIC 222, a first antenna 370, and a second antenna 375. The RF front-end module 300 may also be connected to another RF front-end module (e.g., the second RFFE 234 of FIG. 2). The RF front-end module 300 may receive an SRS from the other RF front-end module through the first port 335 and the second port 355.

According to an embodiment, an RF signal may be transmitted or received through the RF front-end module 300. A path for a signal transmitted to an antenna through the RF front-end module 300 may be referred to as a transmission path, and a path for a signal received by the RF front-end module 300 through the antenna may be referred to as a reception path. Specifically, the transmission path may be a path through which a signal received from the RFIC 222 is transmitted to the first antenna 370 or the second antenna 375 via the first PA 305, the first switch 315, the first filter 320, and the third switch 360 in the RF front-end module 300. The reception path may be a path through which a signal received from the first antenna 370 or the second antenna 375 is transmitted to the third switch 360, the first filter 320, the first switch 315, and the first LNA 310 in the RF front-end module 300 and the RFIC 222. According to another embodiment, the transmission path may be a path through which a signal received from the RFIC 222 is transmitted to the first antenna 370 or the second antenna 375 via the second PA 325, the second switch 340, the second filter 345, and the third switch 360 in the RF front-end module 300. The reception path may be a path through which a signal received from the first antenna 370 or the second antenna 375 is transmitted to the third switch 360, the second filter 345, the second switch 340, and the second LNA 330 in the RF front-end module 300 and the RFIC 222. According to another embodiment, the transmission path may be a path through which a signal (e.g., an SRS) received through the first port 335 is transmitted to the second switch 340, the third filter 350, the third switch 360, and the first antenna 370 or the second antenna 375. According to an embodiment, the transmission path or the reception path may be determined depending on an element selected by the first switch 315 or the second switch 340, and thus, the first switch 315 and the second switch 340 may be referred to as a first transmission/reception switch and a second transmission/reception switch. The third switch 360 may be a switch to select an element to be connected to the antenna, and may be referred to as an antenna switch.

According to an embodiment, the first PA 305 and the second PA 325 may amplify the strength (or amplitude) of a signal received from the RFIC 222. The first LNA 310 and the second LNA 330 may amplify the strength (or amplitude) of a signal received from the first antenna 370 and/or the second antenna 375 before transmitting the signal to the RFIC 222. The first switch 315 may select an element to be connected to the first filter 320. When the first PA 305 is selected through the first switch 315, a signal path may be the transmission path. When the first LNA 310 is selected through the first switch 315, a signal path may be the reception path. The second switch 340 may select an element to be connected to the second filter 345 and/or the third filter 350. The second switch 340 may connect the second filter 345 to the second PA 325 or the second LNA 330, and may connect the third filter 350 to the first port 335. When the second PA 325 or the first port 335 is selected through the second switch 340, a signal path may be the transmission path. When the second LNA 330 is selected through the second switch 340, a signal path may be the reception path. When the second PA 325 is selected through the second switch 340, a signal transmitted from the RFIC 222 is selected. When the first port 335 is selected, an SRS received from the other RF front-end module is selected. The first filter 320 may filter a signal in a specific band among a signal received from the first switch 315 or a signal received from the third switch 360. The second filter 345 may filter a signal in a specific band among a signal received from the second switch 340 or a signal received from the third switch 360. The third filter 350 may filter an SRS received from the first port 335. The third switch 360 may select an element to be connected to the first antenna 370 and/or the second antenna 375. The element that can be connected to the first antenna 370 and/or the second antenna 375 may be the first filter 320, the second filter 345, the third filter 350, and/or the second port 355. According to an embodiment, the third switch 360 may be a multi-on switch that enables one terminal to simultaneously select (or connect) two or more terminals. The third switch 360 may simultaneously connect the first antenna 370 to the first filter 320 and the third filter 350 to simultaneously select the signal transmitted from the RFIC 222 and the SRS received from the other RF front-end module. The first filter 320 may include a plurality of filters. When the filter includes the plurality of filters, a filter corresponding to a selected frequency may be selected. For example, the first filter 320 may include a filter supporting a plurality of TDD frequency bands and a filter supporting a plurality of FDD frequency bands, and a filter corresponding to a selected frequency band may be selected through the third switch 360. When the first filter 320 includes a plurality of filters and at least one filter is selected, unselected filters may be designed to be open. According to another embodiment, the third switch 360 may simultaneously connect the second antenna 375 to the first filter 320 and the third filter 350 to simultaneously select the signal transmitted from the RFIC 222 and the SRS received from the other RF front-end module. According to another embodiment, the third switch 360 may connect the first antenna 370 and/or the second antenna 375 to the second port 355 to select the SRS received from the other RF front-end module. The filters connected to the third switch 360 may be designed in view of matching so that performance does not deteriorate even when a plurality of filters is selected by the third switch 360.

According to an embodiment, an RF front-end module that generates and transmits an SRS may have a structure the same as or similar to that of the RF front-end module 300 described regarding FIG. 3. The RF front-end module that generates and transmits the SRS may include a coupler, a switch, and/or a separate port connected to an antenna, thus transmitting the generated SRS to another RF front-end module 300.

FIG. 4 to FIG. 7 below illustrate configurations of an RF front-end module that transmits an SRS and data according to one or more embodiments of the disclosure.

Figure 4:
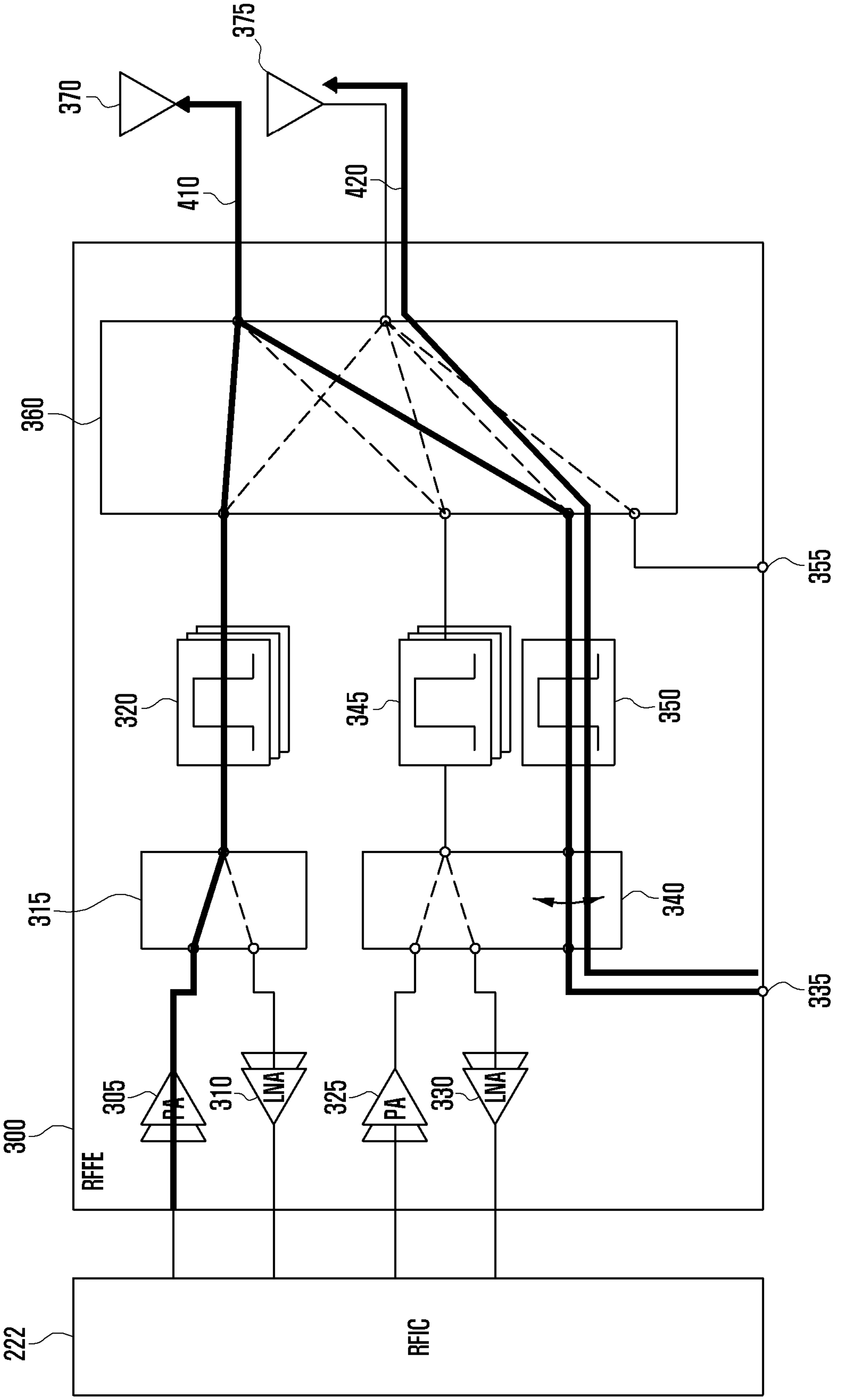
FIG. 4 illustrates a configuration of an RF front-end module that transmits an SRS and data by using one antenna, according to an embodiment.

FIG. 4 illustrates a configuration of the RF front-end module 300 that transmits an SRS and data by using one antenna according to an embodiment.

As illustrated in FIG. 3, the RF front-end module 300 (e.g., the first RFFE 232 in FIG. 2) may include the first power amplifier (PA) 305, the second PA 325, the first low-noise amplifier (LNA) 310, the second LNA 330, the first switch (or first transmission/reception switch) 315, the second switch (or second transmission/reception switch) 340, the first filter 320, the second filter 345, the third filter 350, the third switch (or antenna switch) 360, the first port 335, and the second port 355.

According to an embodiment, the RF front-end module 300 may be configured to support both of a TDD frequency band and an FDD frequency band. When an electronic device including the RF front-end module 300 operates in a TDD mode, a component (that processes a signal in the TDD frequency band) among components included in the RF front-end module 300 may be selected and/or operate to process the signal in the TDD frequency band. When the electronic device including the RF front-end module 300 connects to an ENDC network and uses both the TDD mode and the FDD mode, a signal processed by each component included in the RF front-end module 300 may be a signal in the TDD frequency band and/or a signal in the FDD frequency band.

According to an embodiment, at least some of the components included in the RF front-end module 300 may be configured as a plurality of components, and thus, the RF front-end module 300 may support both the TDD mode and the FDD mode separately (independently) or simultaneously. For example, the first filter 320 may be configured as a plurality of filters to respectively filter signals in a portion of the TDD frequency band and/or signals in a portion of the FDD frequency band. A signal received through the third switch 360 may be filtered through the first filter 320 into a signal in the FDD frequency band and/or a signal in the TDD frequency band.

Hereinafter, it may not be explicitly indicated whether a signal processed by a component included in the RF front-end module 300 is a signal in the FDD frequency band or a signal in the TDD frequency band. Since the signal in the FDD frequency band and the signal in the TDD frequency band may be signals that differ only in frequency band, the signal selected or processed by the component included in the RF front-end module 300 may change depending on a mode (e.g., TDD/FDD) in which the RF front-end module 300 operates.

According to an embodiment, the RF front-end module 300 may be connected to an RFIC 222, a first antenna 370, and a second antenna 375. The RF front-end module 300 may also be connected to another RF front-end module (e.g., the second RFFE 234 of FIG. 2). The RF front-end module 300 may receive a sounding reference signal (SRS) from the other RF front-end module through the first port 335 and the second port 355.

According to an embodiment, the first PA 305 and the second PA 325 may amplify the strength (or amplitude) of a signal received from the RFIC 222. The first LNA 310 and the second LNA 330 may amplify the strength of a signal received from the first antenna 370 and/or the second antenna 375 before transmitting the signal to the RFIC 222. The first switch 315 may select an element to be connected to the first filter 320. According to an embodiment, the first filter 320 may include a plurality of filters, and an element to be connected to a filter (selected according to an operating frequency band) may be selected by the first switch 315. The second switch 340 may select an element to be connected to the second filter 345 and/or the third filter 350. According to an embodiment, the second filter 345 may also include a plurality of filters, and an element to be connected to a filter (selected according to an operating frequency band) may be selected by the second switch 340. Since a transmission path or a reception path may be determined depending on an element selected by the first switch 315 or the second switch 340, the first switch 315 and the second switch 340 may be referred to as a first transmission/reception switch and a second transmission/reception switch. The first switch 315 and/or the second switch 340 may be controlled to select an element corresponding to the operating frequency. The first filter 320 may be a band-pass filter that is configured to filter a signal in a specific band among a signal received from the first switch 315 or a signal received from the third switch 360. The first filter 320 may include the plurality of filters to filter signals in a plurality of frequency bands. The second filter 345 may be a band-pass filter that is configured to filter a signal in a specific band among a signal received from the second switch 340 or a signal received from the third switch 360. The second filter 345 may also include the plurality of filters to filter signals in a plurality of frequency bands. The third filter 350 may be a band-pass filter that is configured to filter an SRS received from the first port 335. The third switch 360 may select an element to be connected to the first antenna 370 and/or the second antenna 375. The third switch 360 may be a switch to select an element to be connected to an antenna, and may be referred to as an antenna switch. According to an embodiment, the third switch 360 may be a multi-on switch capable of simultaneously selecting two or more signals. When the first filter 320 and/or the second filter 345 includes the plurality of filters, the third switch 360 may select a filter corresponding to a selected frequency from among the first filter 320 and/or the second filter 345 including the plurality of filters. The filters connected to the third switch 360 may be designed in view of matching so that performance does not deteriorate even when a plurality of filters is selected by the third switch 360, and may be designed to be open when not selected.

Referring to FIG. 4, when the electronic device (e.g., the electronic device 101 of FIG. 1) including the RF front-end module 300 is connected to an ENDC network to simultaneously access LTE and 5G or uses a CA mode, the RF front-end module 300 may simultaneously transmit an SRS and data by using the first antenna 370 as indicated by a transmission path 410.

According to an embodiment, the RF front-end module 300 may receive a signal from the RFIC 222 to the first PA 305 to amplify the magnitude thereof, and may connect the first PA 305 to the first filter 320 through the first switch 315. The signal having passed through the first filter 320 may be transmitted through the first antenna 370 connected by the third switch 360.

According to an embodiment, the RF front-end module 300 may also receive an SRS through the first port 335. The RF front-end module 300 may connect the first port 335 and the third filter 350 by using the second switch 340. The SRS received through the first port 335 may pass through the third filter 350 to be transmitted through the first antenna 370 connected by the third switch 360.

According to an embodiment, the third switch 360 may be the multi-on switch, and may connect both the signal having passed through the first filter 320 and the signal having passed through the third filter 350 to the first antenna 370. The first antenna 370 may simultaneously transmit the signal having passed through the first filter 320 and the signal having passed through the third filter 350.

Subsequently, the RF front-end module 300 may receive the SRS through the first port 335, and may transmit the SRS to the third filter 350 by using the second switch 340, as indicated by a transmission path 420. The SRS received through the first port 335 may be transmitted through the second antenna 375 connected by the third switch 360.

Although FIG. 4 shows that both the signal having passed through the first filter 320 and the signal having passed through the third filter 350 are transmitted through the first antenna 370, both the signal having passed through the first filter 320 and the signal having passed through the third filter 350 may be transmitted through the second antenna 375 according to an embodiment.

Figure 5:
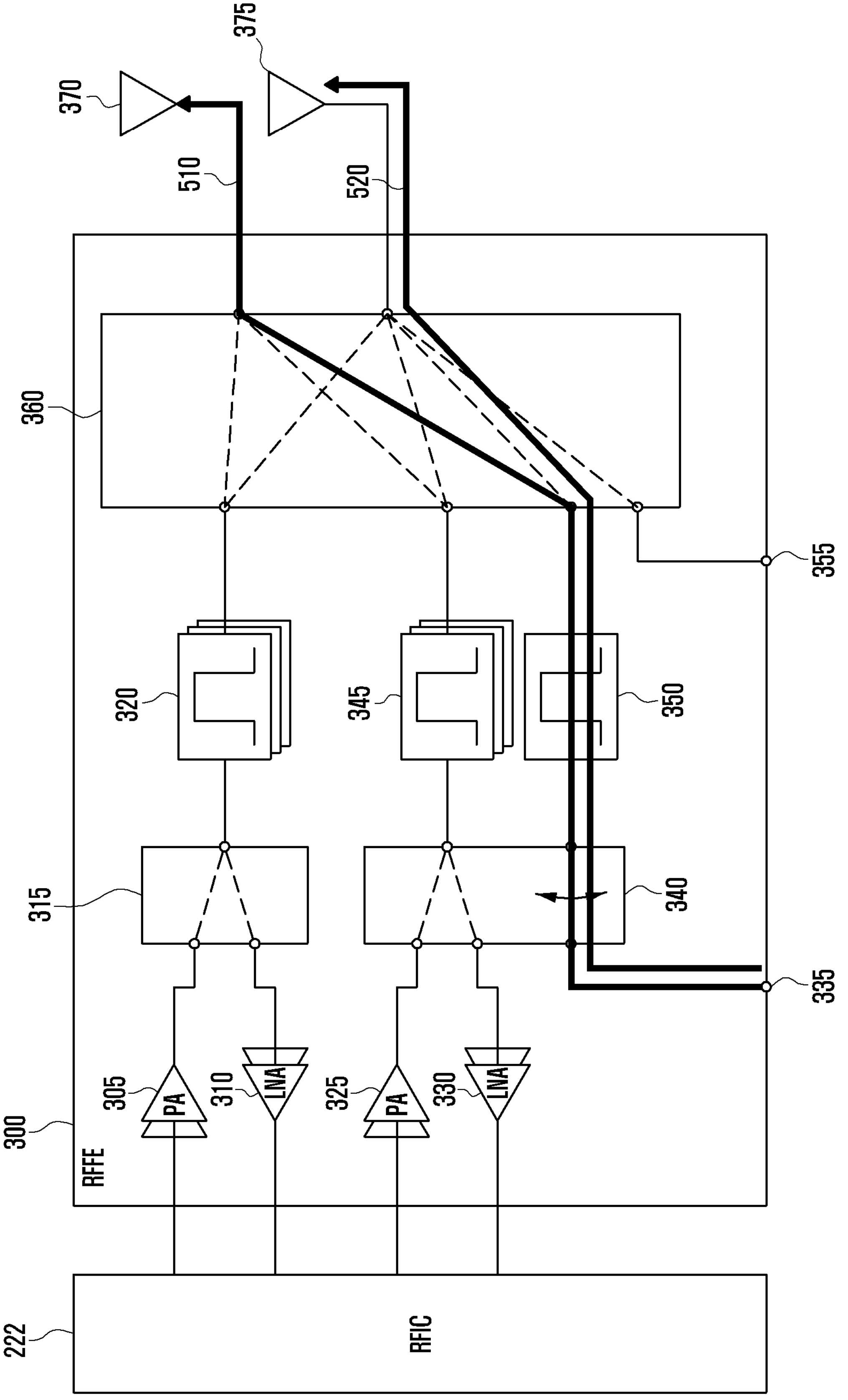
FIG. 5 illustrates a configuration of an RF front-end module that transmits an SRS, according to an embodiment.

FIG. 5 illustrates a configuration of the RF front-end module 300 that transmits an SRS according to an embodiment.

As illustrated in FIG. 3, the RF front-end module 300 (e.g., the first RFFE 232 in FIG. 2) may include the first power amplifier (PA) 305, the second PA 325, the first low-noise amplifier (LNA) 310, the second LNA 330, the first switch (or first transmission/reception switch) 315, the second switch (or second transmission/reception switch) 340, the first filter 320, the second filter 345, the third filter 350, the third switch (or antenna switch) 360, the first port 335, and the second port 355.

According to an embodiment, the RF front-end module 300 may be configured to support both a TDD frequency band and an FDD frequency band. When an electronic device including the RF front-end module 300 operates in a TDD mode, a component that processes a signal in the TDD frequency band among components included in the RF front-end module 300 may be selected and/or operate to process the signal in the TDD frequency band. When the electronic device including the RF front-end module 300 connects to an ENDC network and uses both the TDD mode and the FDD mode, a signal processed by each component included in the RF front-end module 300 may be a signal in the TDD frequency band and/or a signal in the FDD frequency band.

According to an embodiment, at least some of the components included in the RF front-end module 300 may be configured as a plurality of components, and thus, the RF front-end module 300 may support both the TDD mode and the FDD mode separately or simultaneously. For example, the first filter 320 may be configured as a plurality of filters to respectively filter signals in a portion of the TDD frequency band and/or signals in a portion of the FDD frequency band. A signal received through the third switch 360 may be filtered through the first filter 320 into a signal in the FDD frequency band and/or a signal in the TDD frequency band.

Hereinafter, it may not be explicitly indicated whether a signal processed by a component included in the RF front-end module 300 is a signal in the FDD frequency band or a signal in the TDD frequency band. Since the signal in the FDD frequency band and the signal in the TDD frequency band may be signals that differ only in frequency band, the signal selected or processed by the component included in the RF front-end module 300 may change depending on a mode in which the RF front-end module 300 operates (e.g., TDD/FDD).

According to an embodiment, the first PA 305 and the second PA 325 may amplify the strength (or amplitude) of a signal received from an RFIC 222. The first LNA 310 and the second LNA 330 may amplify the strength (or amplitude) of a signal received from the first antenna 370 and/or the second antenna 375 before transmitting the signal to the RFIC 222. The first switch 315 may select an element to be connected to the first filter 320. According to an embodiment, the first filter 320 may include a plurality of filters, and an element to be connected to a filter (selected according to an operating frequency band) may be selected by the first switch 315. The second switch 340 may select an element to be connected to the second filter 345 and/or the third filter 350. According to an embodiment, the second filter 345 may also include a plurality of filters, and an element to be connected to a filter (selected according to an operating frequency band) may be selected by the second switch 340. Since a transmission path or a reception path may be determined depending on an element selected by the first switch 315 or the second switch 340, the first switch 315 and the second switch 340 may be referred to as a first transmission/reception switch and a second transmission/reception switch. The first switch 315 and/or the second switch 340 may be controlled to select an element corresponding to the operating frequency. The first filter 320 may be a band-pass filter that is configured to filter a signal in a specific band among a signal received from the first switch 315 or a signal received from the third switch 360. The first filter 320 may include the plurality of filters to filter signals in a plurality of frequency bands. The second filter 345 may be a band-pass filter that is configured to filter a signal in a specific band among a signal received from the second switch 340 or a signal received from the third switch 360. The second filter 345 may also include the plurality of filters to filter signals in a plurality of frequency bands. The third filter 350 may be a band-pass filter that is configured to filter an SRS received from the first port 335. The third switch 360 may select an element to be connected to the first antenna 370 and/or the second antenna 375. The third switch 360 may be a switch to select an element to be connected to an antenna, and may be referred to as an antenna switch. According to an embodiment, the third switch 360 may be a multi-on switch capable of simultaneously selecting two or more signals. When the first filter 320 and/or the second filter 345 includes the plurality of filters, the third switch 360 may select a filter corresponding to a selected frequency from among the first filter 320 and/or the second filter 345 including the plurality of filters. The filters connected to the third switch 360 may be designed in view of matching so that performance does not deteriorate even when a plurality of filters is selected by the third switch 360, and may be designed to be open when not selected.

Referring to FIG. 5, the RF front-end module 300 may transmit the SRS by using the first antenna 370 and/or the second antenna 375 as indicated by transmission paths 510 and 520.

According to an embodiment, the RF front-end module 300 may receive the SRS through the first port 335 as indicated by the transmission path 510. The RF front-end module 300 may connect the first port 335 and the third filter 350 by using the second switch 340. The RF front-end module 300 may connect the third filter 350 and the first antenna 370 by using the third switch 360. The SRS received through the first port 335 may be transmitted through the first antenna 370.

Subsequently, according to an embodiment, the RF front-end module 300 may receive the SRS through the first port 335 as indicated by the transmission path 520. The RF front-end module 300 may connect the first port 335 and the third filter 350 by using the second switch 340. The RF front-end module 300 may connect the third filter 350 and the second antenna 375 by using the third switch 360. The SRS received through the first port 335 may be transmitted through the second antenna 375.

According to an embodiment, a base station may receive the SRS that the RF front-end module 300 transmits by using the first antenna 370 and the second antenna 375, and may estimate the state of a downlink channel by using the received SRS.

Figure 6:
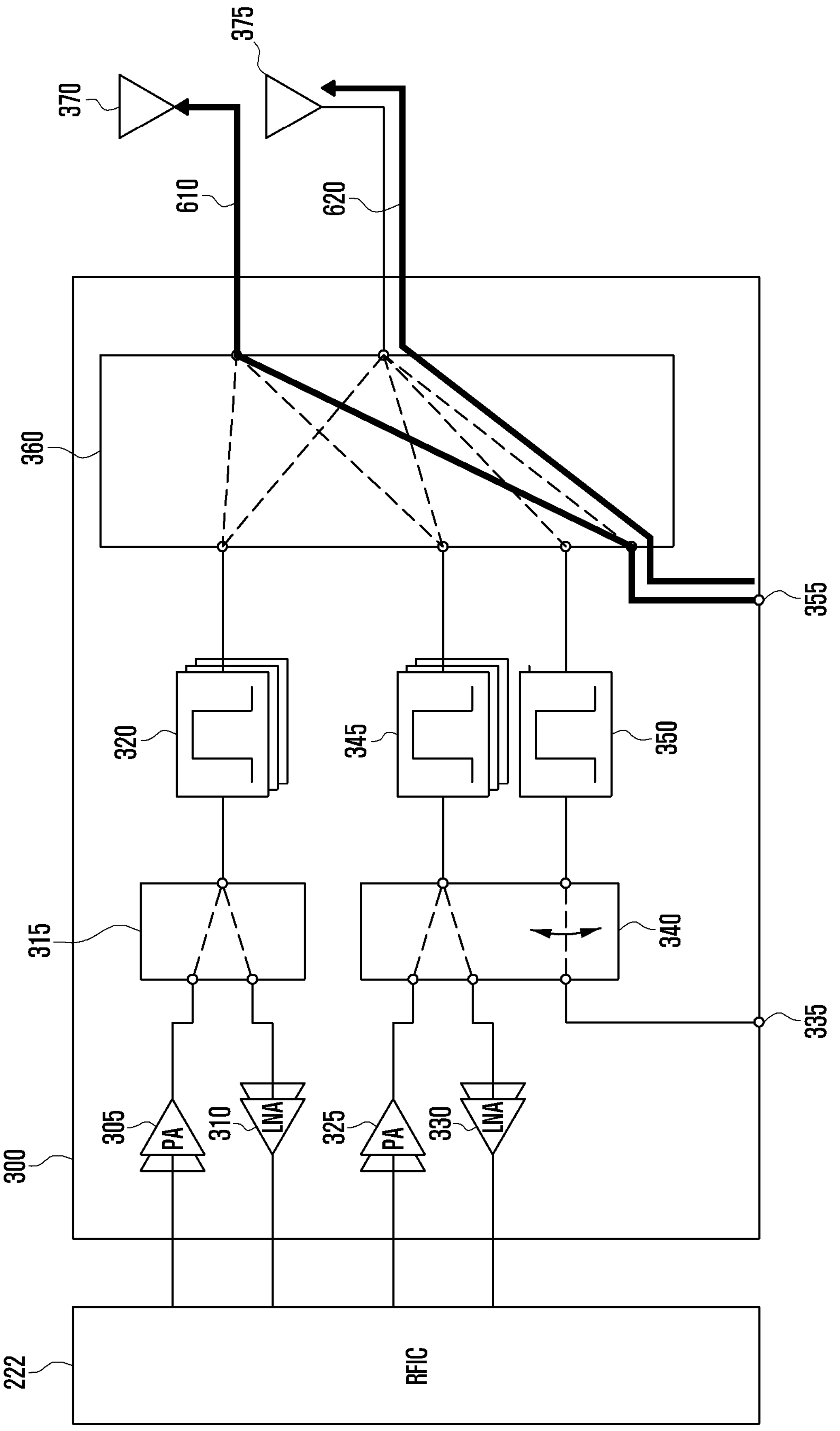
FIG. 6 illustrates a configuration of an RF front-end module that transmits an SRS, according to another embodiment.

FIG. 6 illustrates a configuration of the RF front-end module 300 that transmits an SRS according to another embodiment.

As illustrated in FIG. 3, the RF front-end module 300 (e.g., the first RFFE 232 in FIG. 2) may include the first power amplifier (PA) 305, the second PA 325, the first low-noise amplifier (LNA) 310, the second LNA 330, the first switch (or first transmission/reception switch) 315, the second switch (or second transmission/reception switch) 340, the first filter 320, the second filter 345, the third filter 350, the third switch (or antenna switch) 360, the first port 335, and the second port 355.

According to an embodiment, the RF front-end module 300 may be configured to support both a TDD frequency band and an FDD frequency band. When an electronic device including the RF front-end module 300 operates in a TDD mode, a component that processes a signal in the TDD frequency band among components included in the RF front-end module 300 may be selected and/or operate to process the signal in the TDD frequency band. When the electronic device including the RF front-end module 300 connects to an ENDC network and uses both the TDD mode and the FDD mode, a signal processed by each component included in the RF front-end module 300 may be a signal in the TDD frequency band and/or a signal in the FDD frequency band.

According to an embodiment, at least some of the components included in the RF front-end module 300 may be configured as a plurality of components, and thus, the RF front-end module 300 may support both the TDD mode and the FDD mode separately or simultaneously. For example, the first filter 320 may be configured as a plurality of filters to respectively filter signals in a portion of the TDD frequency band and/or signals in a portion of the FDD frequency band. A signal received through the third switch 360 may be filtered through the first filter 320 into a signal in the FDD frequency band and/or a signal in the TDD frequency band.

Hereinafter, it may not be explicitly indicated whether a signal processed by a component included in the RF front-end module 300 is a signal in the FDD frequency band or a signal in the TDD frequency band. Since the signal in the FDD frequency band and the signal in the TDD frequency band may be signals that differ only in frequency band, the signal selected or processed by the component included in the RF front-end module 300 may change depending on a mode in which the RF front-end module 300 operates (e.g., TDD/FDD).

According to an embodiment, the first PA 305 and the second PA 325 may amplify the strength (or amplitude) of a signal received from an RFIC 222. The first LNA 310 and the second LNA 330 may amplify the strength (or amplitude) of a signal received from the first antenna 370 and/or the second antenna 375 before transmitting the signal to the RFIC 222. The first switch 315 may select an element to be connected to the first filter 320. According to an embodiment, the first filter 320 may include a plurality of filters, and an element to be connected to a filter (selected according to an operating frequency band) may be selected by the first switch 315. The second switch 340 may select an element to be connected to the second filter 345 and/or the third filter 350. According to an embodiment, the second filter 345 may also include a plurality of filters, and an element to be connected to a filter (selected according to an operating frequency) band may be selected by the second switch 340. Since a transmission path or a reception path may be determined depending on an element selected by the first switch 315 or the second switch 340, the first switch 315 and the second switch 340 may be referred to as a first transmission/reception switch and a second transmission/reception switch. The first switch 315 and/or the second switch 340 may be controlled to select an element corresponding to the operating frequency. The first filter 320 may be a band-pass filter that is configured to filter a signal in a specific band among a signal received from the first switch 315 or a signal received from the third switch 360. The first filter 320 may include the plurality of filters to filter signals in a plurality of frequency bands. The second filter 345 may be a band-pass filter that is configured to filter a signal in a specific band among a signal received from the second switch 340 or a signal received from the third switch 360. The second filter 345 may also include the plurality of filters to filter signals in a plurality of frequency bands. The third filter 350 may be a band-pass filter that is configured to filter an SRS received from the first port 335. The third switch 360 may select an element to be connected to the first antenna 370 and/or the second antenna 375. In one embodiment, the third switch 360 may be configured to select an element (such as, a filter or a plurality of filters) to be connected with the first antenna 370 and/or the second antenna 375, thus the third switch 360 may transmit a signal (received from the selected element) to one or more of the plurality of antennas. The third switch 360 may select an element to be connected to an antenna, and may be referred to as an antenna switch. According to an embodiment, the third switch 360 may be a multi-on switch capable of simultaneously selecting two or more signals. When the first filter 320 and/or the second filter 345 includes the plurality of filters, the third switch 360 may select a filter corresponding to a selected frequency from among the first filter 320 and/or the second filter 345 including the plurality of filters. The filters connected to the third switch 360 may be designed in view of matching so that performance does not deteriorate even when a plurality of filters is selected by the third switch 360, and may be designed to be open when not selected.

Referring to FIG. 6, the RF front-end module 300 may transmit the SRS by using the first antenna 370 and/or the second antenna 375 as indicated by transmission paths 610 and 620.

According to an embodiment, the RF front-end module 300 may connect the SRS received through the second port 355 to the first antenna 370 by using the third switch 360 as indicated by the transmission path 610. The received SRS may be transmitted through the first antenna 370.

Subsequently, the RF front-end module 300 may connect the SRS received through the second port 355 to the second antenna 375 by using the third switch 360 as indicated by the transmission path 620. The received SRS may be transmitted through the second antenna 375.

According to an embodiment, a base station may receive the SRS that the RF front-end module 300 of the electronic device transmits by using the first antenna 370 and the second antenna 375, and may estimate the state of a downlink channel by using the received SRS.

Figure 7:
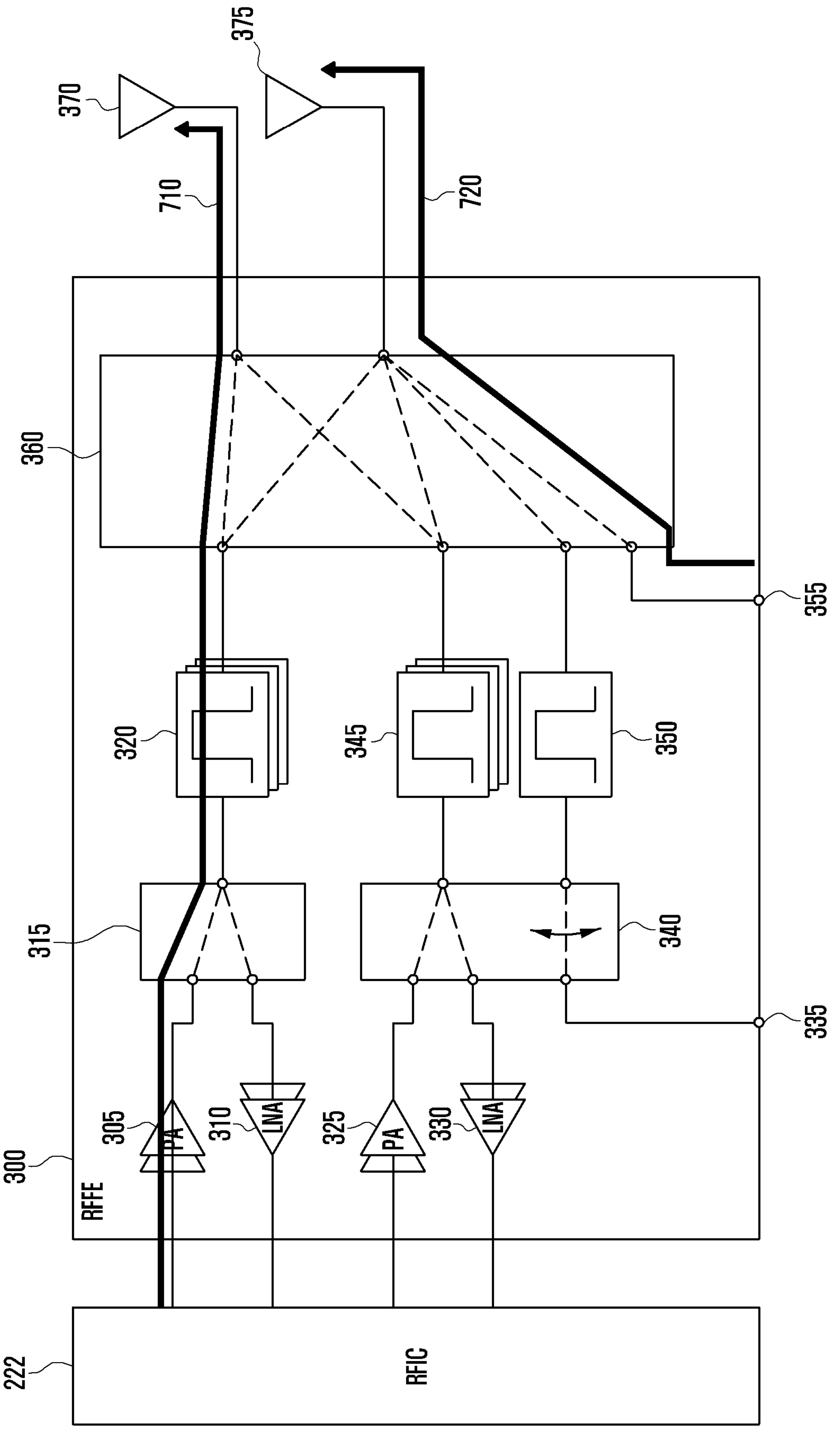
FIG. 7 illustrates a configuration of an RF front-end module that transmits an SRS and data by using a different antenna, according to an embodiment.

FIG. 7 illustrates a configuration of the RF front-end module 300 that transmits an SRS and data by using a different antenna according to an embodiment.

As illustrated in FIG. 3, the RF front-end module 300 (e.g., the first RFFE 232 in FIG. 2) may include the first power amplifier (PA) 305, the second PA 325, the first low-noise amplifier (LNA) 310, the second LNA 330, the first switch (or first transmission/reception switch) 315, the second switch (or second transmission/reception switch) 340, the first filter 320, the second filter 345, the third filter 350, the third switch (or antenna switch) 360, the first port 335, and the second port 355.

According to an embodiment, the RF front-end module 300 may be configured to support both a TDD frequency band and an FDD frequency band. When an electronic device including the RF front-end module 300 operates in a TDD mode, a component that processes a signal in the TDD frequency band among components included in the RF front-end module 300 may be selected and/or operate to process the signal in the TDD frequency band. When the electronic device including the RF front-end module 300 connects to an ENDC network and uses both the TDD mode and the FDD mode, a signal processed by each component included in the RF front-end module 300 may be a signal in the TDD frequency band and/or a signal in the FDD frequency band.

According to an embodiment, at least some of the components included in the RF front-end module 300 may be configured as a plurality of components, and thus, the RF front-end module 300 may support both the TDD mode and the FDD mode separately or simultaneously. For example, the first filter 320 may be configured as a plurality of filters to respectively filter signals in a portion of the TDD frequency band and/or signals in a portion of the FDD frequency band. A signal received through the third switch 360 may be filtered through the first filter 320 into a signal in the FDD frequency band and/or a signal in the TDD frequency band.

Hereinafter, it may not be explicitly indicated whether a signal processed by a component included in the RF front-end module 300 is a signal in the FDD frequency band or a signal in the TDD frequency band. Since the signal in the FDD frequency band and the signal in the TDD frequency band may be signals that differ only in frequency band, the signal selected or processed by the component included in the RF front-end module 300 may change depending on a mode in which the RF front-end module 300 operates (e.g., TDD/FDD).

According to an embodiment, the first PA 305 and the second PA 325 may amplify the strength (or amplitude) of a signal received from an RFIC 222. The first LNA 310 and the second LNA 330 may amplify the strength (or amplitude) of a signal received from the first antenna 370 and/or the second antenna 375 before transmitting the signal to the RFIC 222. The first switch 315 may select an element to be connected to the first filter 320. According to an embodiment, the first filter 320 may include a plurality of filters, and an element to be connected to a filter (selected according to an operating frequency band) may be selected by the first switch 315. The second switch 340 may select an element to be connected to the second filter 345 and/or the third filter 350. According to an embodiment, the second filter 345 may also include a plurality of filters, and an element to be connected to a filter (selected according to an operating frequency band) may be selected by the second switch 340. Since a transmission path or a reception path may be determined depending on an element selected by the first switch 315 or the second switch 340, the first switch 315 and the second switch 340 may be referred to as a first transmission/reception switch and a second transmission/reception switch. The first switch 315 and/or the second switch 340 may be controlled to select an element corresponding to the operating frequency. The first filter 320 may be a band-pass filter that is configured to filter a signal in a specific band among a signal received from the first switch 315 or a signal received from the third switch 360. The first filter 320 may include the plurality of filters to filter signals in a plurality of frequency bands. The second filter 345 may be a band-pass filter that is configured to filter a signal in a specific band among a signal received from the second switch 340 or a signal received from the third switch 360. The second filter 345 may also include the plurality of filters to filter signals in a plurality of frequency bands. The third filter 350 may be a band-pass filter that is configured to filter an SRS received from the first port 335. The third switch 360 may select an element to be connected to the first antenna 370 and/or the second antenna 375. The third switch 360 may be a switch to select an element to be connected to an antenna, and may be referred to as an antenna switch. According to an embodiment, the third switch 360 may be a multi-on switch capable of simultaneously selecting two or more signals. When the first filter 320 and/or the second filter 345 includes the plurality of filters, the third switch 360 may select a filter corresponding to a selected frequency from among the first filter 320 and/or the second filter 345 including the plurality of filters. The filters connected to the third switch 360 may be designed in view of matching so that performance does not deteriorate even when a plurality of filters is selected by the third switch 360, and may be designed to be open when not selected.

Referring to FIG. 7, the RF front-end module 300 may transmit the SRS and data (or a signal) by using the first antenna 370 and the second antenna 375 as indicated by transmission paths 710 and 720. Although FIG. 7 shows that the data is transmitted through the first antenna 370 and the SRS is transmitted through the second antenna 375, the data may be transmitted through the second antenna 375 and the SRS may be transmitted through the first antenna 370.

According to an embodiment, as indicated by the transmission path 710, the RF front-end module 300 may receive a signal from the RFIC 222 to the first PA 305 to amplify the magnitude (or strength) thereof, and may connect the first PA 305 and the first filter 320 by using the first switch 315. The signal having passed through the first filter 320 may be connected to the first antenna 370 by the third switch 360, and transmitted.

According to an embodiment, the RF front-end module 300 may receive an SRS generated by another RF front-end module through the second port 355 as indicated by the transmission path 720. The RF front-end module 300 may connect the second port 355 and the second antenna 375 by using the third switch 360. The SRS received from the other RF front-end module may be transmitted through the second antenna 375.

According to an embodiment, although the signal transmitted through the transmission path 710 may be a signal in an FDD frequency band and the signal transmitted through the transmission path 720 may be a signal in a TDD frequency band, the disclosure is not limited thereto.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at .least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

a plurality of antennas;

a first radio-frequency (RF) front-end module comprising a third switch configured to select one or more signals to be transmitted to or to be received from the plurality of antennas and a plurality of switches configured to select one or more transmission paths and one or more reception paths established with the plurality of antennas, wherein the plurality of switches include a first switch and a second switch, wherein the third switch is a multi-on switch;

a second RF front-end module;

a radio-frequency integrated circuit (RFIC) connected to the first RF front-end module and the second RF front-end module;

memory storing instructions; and at least one processor, wherein the first RF front-end module is configured to receive a sounding reference signal (SRS) from the second RF front-end module, wherein the third switch is connected to a port configured to receive the SRS from the second RF front-end module, and wherein the instructions, when executed by the at least one processor, cause the electronic device to:

determine whether to transmit the SRS simultaneously with a signal generated by the first RF front-end module by using one antenna among the plurality of antennas, based on a determination to simultaneously transmit the SRS and the signal by using the one antenna, adjust the third switch and the plurality of switches to simultaneously transmit the SRS and the signal generated by the first RF front-end module by using the one antenna, and adjust the third switch to select the SRS received from the second RF front-end module.

2. The electronic device of claim 1, wherein the SRS is used for a frequency band in which time division duplexing (TDD) is supported.

3. The electronic device of claim 1, wherein the signal generated by the first RF front-end module is transmitted in a frequency band in which frequency division duplexing (FDD) is supported.

4. The electronic device of claim 1, wherein the port configured to receive the SRS from the second RF front-end module is connected to the second switch, and wherein the instructions, when executed by the at least one processor, further cause the electronic device to, based on a determination to transmit the SRS, adjust the plurality of switches and the third switch to select the SRS received from the second RF front-end module.

5. The electronic device of claim 1, wherein the third switch is connected to another antenna among the plurality of antennas, and wherein the instructions, when executed by the at least one processor, further cause the electronic device to, based on a determination to transmit the SRS simultaneously with the signal by not using the one antenna, adjust the third switch to transmit the SRS by using the one antenna and transmit the signal generated by the first RF front-end module by using the other antenna.

6. The electronic device of claim 1, wherein the instructions, when executed by the at least one processor, further cause the electronic device to support an E-UTRA NR dual connectivity (ENDC) network in which both a long-term evolution (LTE) network and a fifth-generation (5G) network are accessible.

7. The electronic device of claim 1, wherein the instructions, when executed by the at least one processor, further cause the electronic device to support carrier aggregation in a fifth-generation (5G) network.

8. The electronic device of claim 1, wherein the instructions, when executed by the at least one processor, further cause the electronic device to support beamforming by using the plurality of antennas.

9. A communication circuit comprising:

a first radio-frequency (RF) front-end module comprising:

a third switch configured to select one or more signals to be transmitted to or to be received from a plurality of antennas, and a plurality of switches configured to establish one or more transmission paths and one or more reception paths with the plurality of antennas, wherein the plurality of switches comprise a first switch and a second switch, and wherein the third switch is a multi-on switch;

a second RF front-end module; and a radio-frequency integrated circuit (RFIC) connected to the first RF front-end module and the second RF front-end module, wherein the first RF front-end module is configured to receive a sounding reference signal (SRS) from the second RF front-end module, wherein the third switch is connected to a port configured to receive the SRS from the second RF front-end module, wherein the third switch and the plurality of switches included in the first RF front-end module are adjusted to simultaneously transmit the SRS and a signal generated by the first RF front-end module by using one antenna among the plurality of antennas, and wherein the third switch is adjusted to select the SRS received from the second RF front-end module.

10. The communication circuit of claim 9, wherein the SRS is used for a frequency band in which time division duplexing (TDD) is supported.

11. The communication circuit of claim 9, wherein the signal generated by the first RF front-end module is transmitted in a frequency band in which frequency division duplexing (FDD) is supported.

12. A communication circuit comprising:

a first radio-frequency (RF) front-end module comprising:

a third switch configured to select a set of signals to be transmitted to or to be received from a plurality of antennas, a first switch configured to select a first element to establish a first transmission path with the plurality of antennas or a second element to establish a first reception path with the plurality of antennas, and a second switch configured to select a third element to establish a second transmission path with the plurality of antennas or a fourth element to establish a second reception path with the plurality of antennas, wherein the third switch is a multi-on switch;

a second RF front-end module; and a radio-frequency integrated circuit (RFIC) connected to the first RF front-end module and the second RF front-end module, wherein the first RF front-end module is configured to receive a sounding reference signal (SRS) from the second RF front-end module, wherein the third switch is connected to a port configured to receive the SRS from the second RF front-end module, wherein the first switch and the second switch included in the first RF front-end module are adjusted to simultaneously transmit the SRS and a signal generated by the first RF front-end module by using one antenna among the plurality of antennas, and wherein the third switch is adjusted to select the SRS received from the second RF front-end module.

13. The communication circuit of claim 12, wherein the first element or the third element is a power amplifier.

14. The communication circuit of claim 12, wherein the second element or the fourth element is a low-noise amplifier.

* * * * *